United States Patent
Tong et al.

(10) Patent No.: US 7,350,187 B1
(45) Date of Patent: Mar. 25, 2008

(54) SYSTEM AND METHODS FOR AUTOMATICALLY CREATING LISTS

(75) Inventors: Simon Tong, Mountain View, CA (US); Jeff Dean, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 779 days.

(21) Appl. No.: 10/425,819

(22) Filed: Apr. 30, 2003

(51) Int. Cl.
   *G06F 9/44* (2006.01)
   *G06F 9/45* (2006.01)

(52) U.S. Cl. .......................... 717/104; 717/109; 707/2

(58) Field of Classification Search ........ 717/104–113, 717/120, 123, 125, 144; 707/100, 203, 2–4; 709/203
   See application file for complete search history.

(56) References Cited

U.S. PATENT DOCUMENTS

| | | | | |
|---|---|---|---|---|
| 5,675,788 | A * | 10/1997 | Husick et al. | 707/104.1 |
| 5,737,734 | A * | 4/1998 | Schultz | 707/5 |
| 5,905,863 | A * | 5/1999 | Knowles et al. | 709/206 |
| 6,093,215 | A * | 7/2000 | Buxton et al. | 717/107 |
| 6,256,648 | B1 * | 7/2001 | Hill et al. | 715/501.1 |
| 6,266,656 | B1 * | 7/2001 | Ohno | 706/20 |
| 6,275,977 | B1 * | 8/2001 | Nagai et al. | 717/104 |
| 6,553,365 | B1 * | 4/2003 | Summerlin et al. | 707/2 |
| 6,557,164 | B1 * | 4/2003 | Faustini | 717/107 |
| 6,606,744 | B1 * | 8/2003 | Mikurak | 717/174 |
| 6,651,057 | B1 * | 11/2003 | Jin et al. | 707/5 |
| 6,697,799 | B1 * | 2/2004 | Neal et al. | 707/3 |
| 6,728,748 | B1 * | 4/2004 | Mangipudi et al. | 718/105 |
| 6,836,773 | B2 * | 12/2004 | Tamayo et al. | 707/6 |
| 6,847,922 | B1 * | 1/2005 | Wampler, II | 703/1 |
| 6,941,293 | B1 * | 9/2005 | Dean et al. | 707/3 |
| 6,950,786 | B1 * | 9/2005 | Sonneland et al. | 703/2 |
| 7,043,492 | B1 * | 5/2006 | Neal et al. | 707/101 |
| 7,051,014 | B2 * | 5/2006 | Brill et al. | 707/2 |
| 7,051,077 | B2 * | 5/2006 | Lin | 709/207 |
| 7,117,208 | B2 * | 10/2006 | Tamayo et al. | 707/6 |
| 7,188,332 | B2 * | 3/2007 | Charisius et al. | 717/104 |

OTHER PUBLICATIONS

Kang et al, "Query type classification for web document retrieval", ACM SIGIR, pp. 64-71, 2003.*
Bergholz et al, "Learning query languages of web interfaces", ACM SAC, pp. 1114-1121, 2004.*
Shih et al, "Using URL and table layout for web classification tasks", ACM WWW, pp. 193-202, 2004.*
Hofen et al, "Generating web application frpm process models", ACM ICWE pp. 1-10, 2006.*
Sergey Brin; "Extracting Patterns and Relations from the World Wide Web;" Proceedings of the 1998 International Workshop on the Web and Databases; Mar. 1998; 12 pages.
Andrew McCallum et al.; "A Comparison of Event Models for Naïve Bayes Text Classification;" AAAI Workshop on Learning for Text Categorization; 1998; 17 pages.
Andrew McCallum; "Employing EM and Pool-Based Active Learning for Text Classification;" Proceedings of the Fifteenth International Conference on Machine Learning; 1998; 9 pages.

* cited by examiner

*Primary Examiner*—Anil Khatri
(74) *Attorney, Agent, or Firm*—Harrity Snyder, LLP

(57) ABSTRACT

A system automatically creates a list from items in existing lists. The system receives one or more example items corresponding to the list and assigns weights to the items in the existing lists based on the one or more example items. The system then forms the list based on the items and the weights assigned to the items.

27 Claims, 16 Drawing Sheets

FIG. 6B

4TH LIST:
- TOYOTA
- MAZDA
- JAGUAR
- NISSAN
- FORD
- DODGE
- BUICK
- INFINITY

3RD LIST:
- HONDA
- MATT
- KIM
- MIKEY

2ND LIST:
- HONDA
- JAGUAR
- NISSAN
- FORD

1ST LIST:
- HONDA
- BMW
- TOYOTA
- JAGUAR

FIG. 6C

0.001
- TOYOTA
- MAZDA
- JAGUAR
- NISSAN
- FORD
- DODGE
- BUICK
- INFINITY

4TH LIST 0.2
- HONDA
- MATT
- KIM
- MIKEY

3RD LIST 0.9
- HONDA
- BMW
- TOYOTA
- JAGUAR

1ST LIST 0.2
- HONDA
- JAGUAR
- NISSAN
- FORD

2ND LIST

- HONDA: 1.300
- BMW: 0.900
- TOYOTA: 0.901
- MAZDA: 0.001
- JAGUAR: 1.101
- NISSAN: 0.201
- FORD: 0.201
- DODGE: 0.001
- BUICK: 0.001
- INFINITY: 0.001
- MATT: 0.200
- KIM: 0.200
- MIKEY: 0.200

FIG. 6E

- HONDA: 2.389
- BMW: 0.999
- TOYOTA: 1.299
- MAZDA: 0.300
- JAGUAR: 2.289
- NISSAN: 1.290
- FORD: 1.290
- DODGE: 0.300
- BUICK: 0.300
- INFINITY: 0.300
- MATT: 0.400
- KIM: 0.400
- MIKEY: 0.400

0.9 — 4TH LIST
- TOYOTA
- MAZDA
- JAGUAR
- NISSAN
- FORD
- DODGE
- BUICK
- INFINITY 0.3 — 3RD LIST
- HONDA
- MATT
- KIM
- MIKEY 0.999 — 1ST LIST
- HONDA
- BMW
- TOYOTA
- JAGUAR 0.999 — 2ND LIST
- HONDA
- JAGUAR
- NISSAN
- FORD

- HONDA: 2.298
- BMW: 0.999
- TOYOTA: 1.899
- MAZDA: 0.900
- JAGUAR: 2.898
- NISSAN: 1.899
- FORD: 1.899
- DODGE: 0.900
- BUICK: 0.900
- INFINITY: 0.900
- MATT: 0.300
- KIM: 0.300
- MIKEY: 0.300

FIG. 6I

SYSTEM AND METHODS FOR AUTOMATICALLY CREATING LISTS

BACKGROUND OF THE INVENTION

1. Field of the Invention

The present invention relates generally to lists of information and, more particularly, to systems and methods for automatically creating lists given one or more examples.

2. Description of Related Art

The World Wide Web ("web") provides a vast amount of information of different types, including textual data, video data, and audio data. This information is often scattered among many web servers and hosts using many different formats.

One particular type of information often present in the web includes lists, such as lists of restaurants, lists of automobiles, lists of names, etc. Lists may be identified in a number of different ways. For example, a list may include an ordered list or unordered list. Special tags in a HyperText Markup Language (HTML) document identify the presence of ordered and unordered lists. An ordered list commences with an <OL> tag; whereas an unordered list commences with an <UL> tag. Each item in an ordered or unordered list is preceded by an <IL> tag.

Another type of list may include a definition list. A special tag in a HTML document identifies the presence of a definition list. A definition list commences with a <DL> tag. Each item in a definition list is preceded by a <DT> tag. Yet another type of list may include document headers. Special tags in a HTML document identifies headers using <H1> through <H6> tags. Other types of lists may be presented in yet other ways. For example, a list may be presented as items in a table or as items separated by commas or tabs.

There currently exists no mechanisms for quickly and efficiently generating lists of items given one or more examples. Accordingly, there is a need in the art for mechanisms to automatically generate lists of items based on one or more examples, both quickly and efficiently.

SUMMARY OF THE INVENTION

Systems and methods consistent with the principles of the invention address this and other needs by automatically creating lists of items given a number of examples.

In accordance with an aspect of the invention, a method automatically creates a list from items in existing lists. The method includes receiving one or more example items corresponding to the list and assigning weights to the items in the existing lists based on the one or more example items. The method also includes forming the list based on the items and the weights assigned to the items.

According to another aspect, a method for creating a list is provided. The method includes generating an on-topic model and classifying existing lists based on the on-topic model to determine measures of confidence that the existing lists were generated using the on-topic model. The method also includes forming a list from items in the classified existing lists.

According to yet another aspect, a system for creating a list includes a list identifier, a list classifier, and a list processor. The list identifier is configured to identify existing lists, where each of the existing lists includes multiple items. The list classifier is configured to generate an on-topic model and determine confidence scores that the existing lists were generated using the on-topic model. The list processor is configured to form a list from the items in the existing lists and the determined confidence scores associated with the existing lists.

According to a further aspect, a method for creating a list is provided. The method includes receiving one or more example items corresponding to the list, generating an on-topic model based on the one or more example items, and classifying existing lists based on the on-topic topic model. The method further includes assigning weights to items in the existing lists based on the classified existing lists, adding the weights for each of the items to generate a total weight for each of the items, and forming the list based on the items and the total weights for the items.

According to another aspect, a system includes a master and multiple slaves. The master is configured to receive one or more example items corresponding to a list, and generate an on-topic model based on the one or more example items. Each of the slaves is configured to classify a subset of existing lists based on the on-topic model, assign weights to items in the existing lists based on the classified existing lists, add the weights for each of the items to generate a total weight for each of the items, and send the items and the total weights for the items to the master. The master may use the items and the total weights for the items to form the list.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 6A-6J illustrate an example of generating a list according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention automatically generate lists given one or more examples. The systems and methods may use probabilistic modeling to predict lists in a noise tolerant, efficient, and quick manner.

Exemplary Network Configuration

Figure 1:
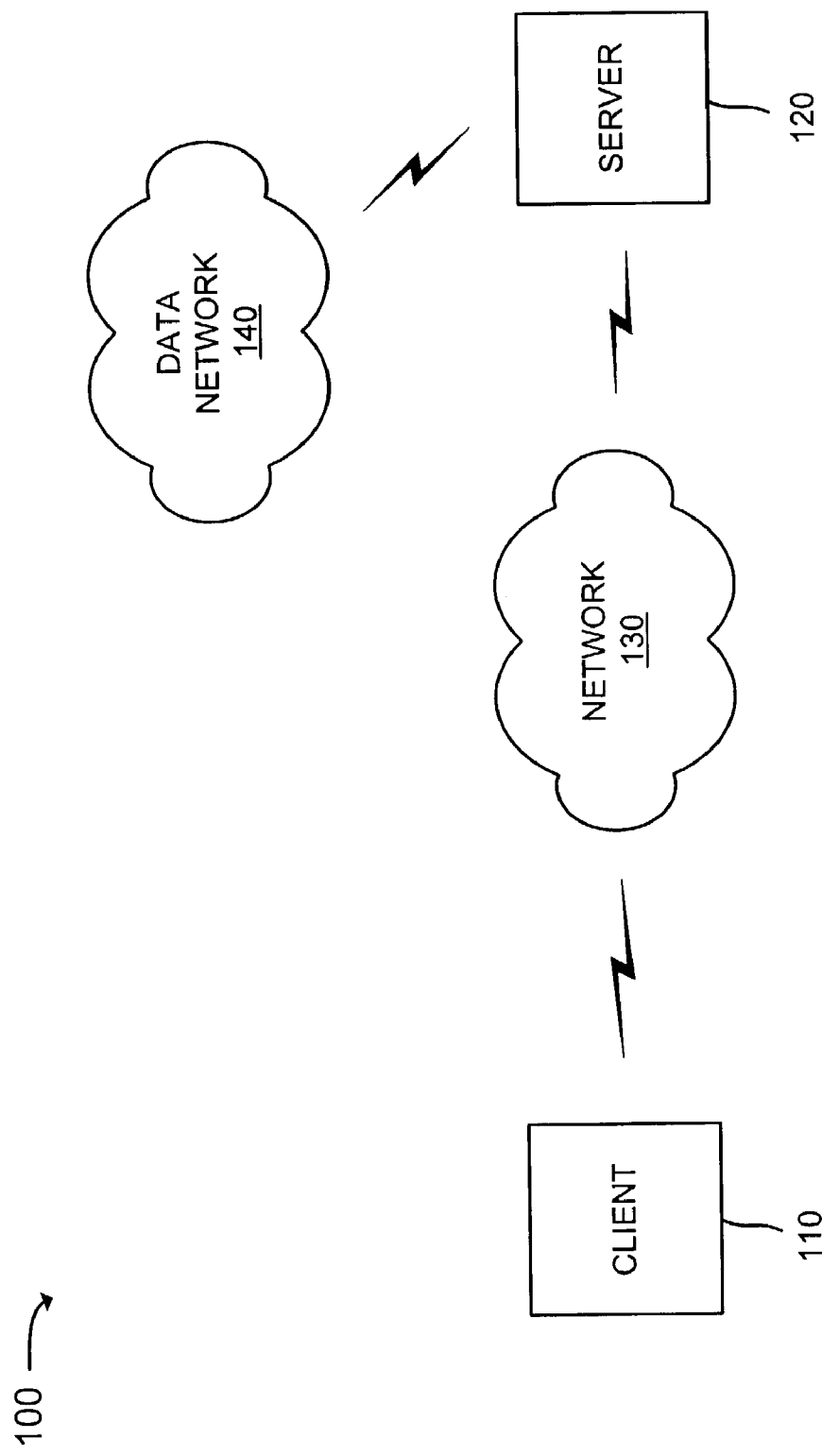
FIG. 1 is a diagram of an exemplary network in which systems and methods consistent with the principles of the invention may be implemented.

FIG. 1 is an exemplary diagram of a network 100 in which systems and methods consistent with the present invention may be implemented. The network 100 may include a client 110 connected to a server 120 via a network 130. Server 120 may also connect to data network 140. Networks 130 and 140 may include the same or different networks, such as a local area network (LAN), a wide area network (WAN), a telephone network, such as the Public Switched Telephone Network (PSTN), an intranet, the Internet, a similar or dissimilar network, or a combination of networks. A single client 110 and server 120 have been illustrated in FIG. 1 for simplicity. In practice, there may be more clients and servers. Also, in some instances, a client may perform the functions of a server and a server may perform the functions of a client.

Client 110 may include one or more devices, such as a personal computer, a wireless telephone, a personal digital assistant (PDA), a lap top, or another type of communication device, a thread or process running on one of these devices, and/or objects executable by these devices. Server 120 may include one or more server devices; threads, and/or objects that operate upon, search, maintain, and/or manage documents in a manner consistent with the principles of the invention. Client 110 and server 120 may connect to network 130 via wired, wireless, or optical connections.

In an implementation consistent with the principles of the invention, server 120 may receive one or more example items from client 110. Server 120 may use the one or more example items to predict a list of items based on lists of items available from devices connected to server 120, network 130, and/or network 140. These available lists may include lists that have already been compiled and may be referred to generally as "existing lists."

Exemplary Server Architecture

Figure 2:
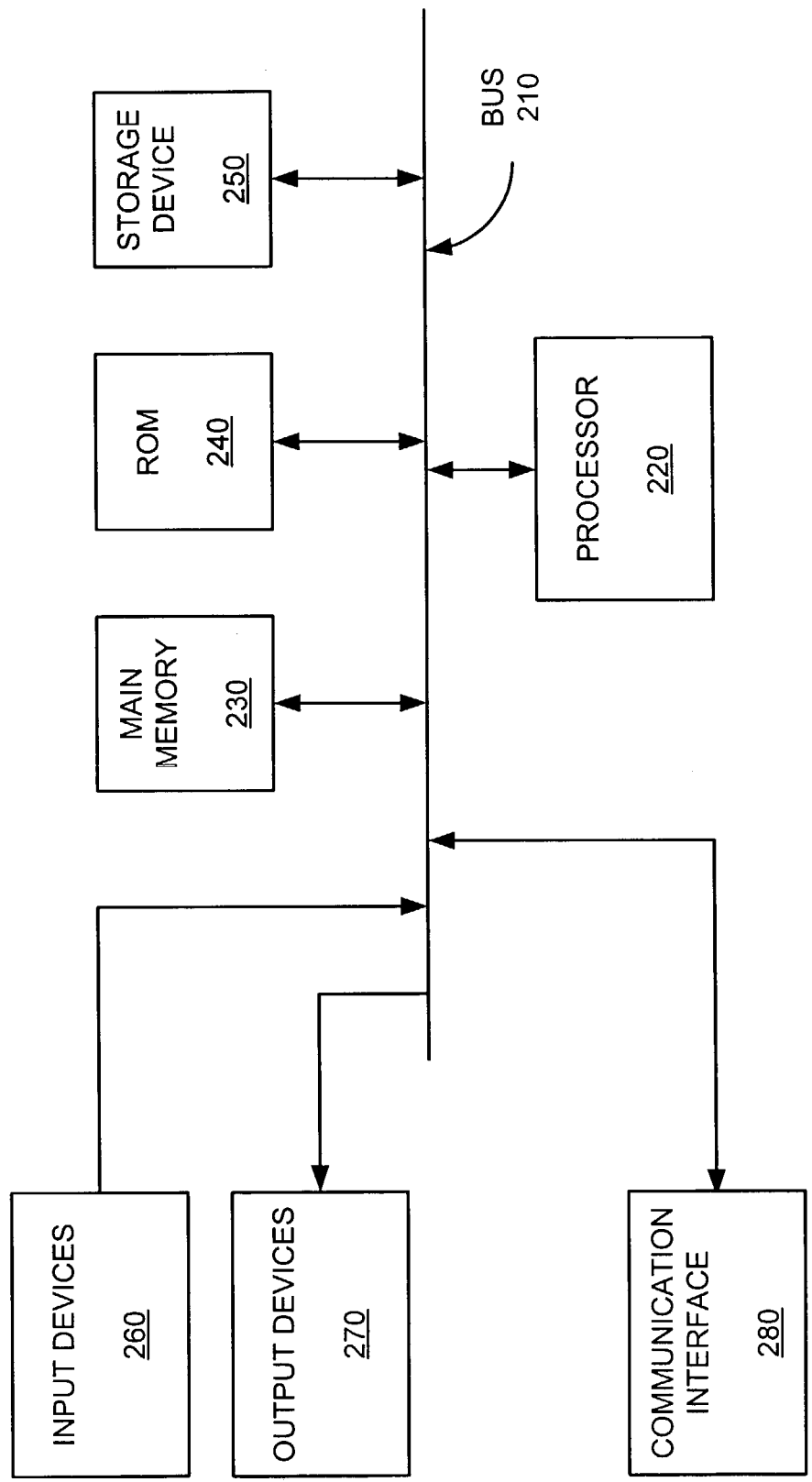
FIG. 2 is an exemplary diagram of a server of FIG. 1 in an implementation consistent with the principles of the invention.

FIG. 2 is an exemplary diagram of the server 120 in an implementation consistent with the principles of the invention. Server 120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of server 120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input devices 260 may include one or more conventional mechanisms that permit an operator to input information to server 120, such as a keyboard, a mouse, a pen, voice recognition and/or biometric mechanisms, etc. Output devices 270 may include one or more conventional mechanisms that output information to the operator, including a display, a printer, a speaker, etc. Communication interface 280 may include any transceiver-like mechanism that enables server 120 to communicate with other devices and/or systems. For example, communication interface 280 may include mechanisms for communicating with another device or system via a network, such as network 130 or 140.

As will be described in detail below, server 120, consistent with the present invention, may perform certain operations relating to the generation of lists. Server 120 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3:
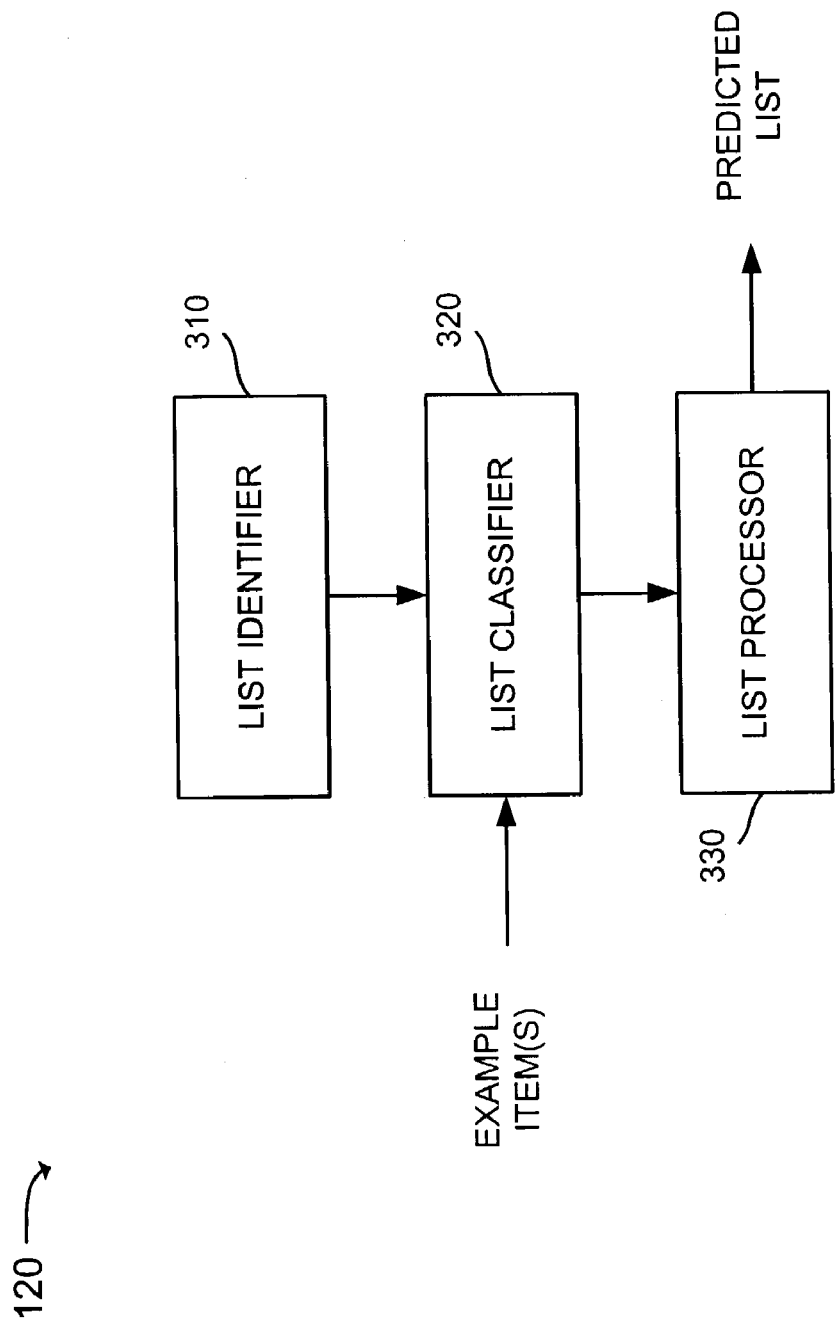
FIG. 3 is a diagram of an exemplary functional block diagram of a portion of the server of FIG. 2 according to an implementation consistent with the principles of the invention.

FIG. 3 is an exemplary functional block diagram of a portion of server 120 according to an implementation consistent with the present invention. The logical blocks illustrated in FIG. 3 may be implemented in software, hardware, or a combination of hardware and software.

Server 120 may include list identifier 310, list classifier 320, and list processor 330. List identifier 310 may include logic that "crawls" documents on network 130 and/or 140 to identify existing lists. List identifier 310 may generate a hit list index in which each item (which can include one or more words) is associated with all of the identified lists that contain that item.

List classifier 320 may include logic that creates lists based on one or more example items. In one implementation, list classifier 320 may be configured as a Naive Bayes classifier. As described in more detail below, list classifier 320 may use probabilistic modeling to create the lists from existing lists that are generally available on network 130 and/or 140. These existing lists may include the lists identified by list identifier 310.

List processor 330 may include logic that processes the lists generated by list classifier 320 and outputs lists to client 110. For example, list processor 330 may order items in a list and possibly format the list for presentation to client 110.

Exemplary Processing

Figure 4:
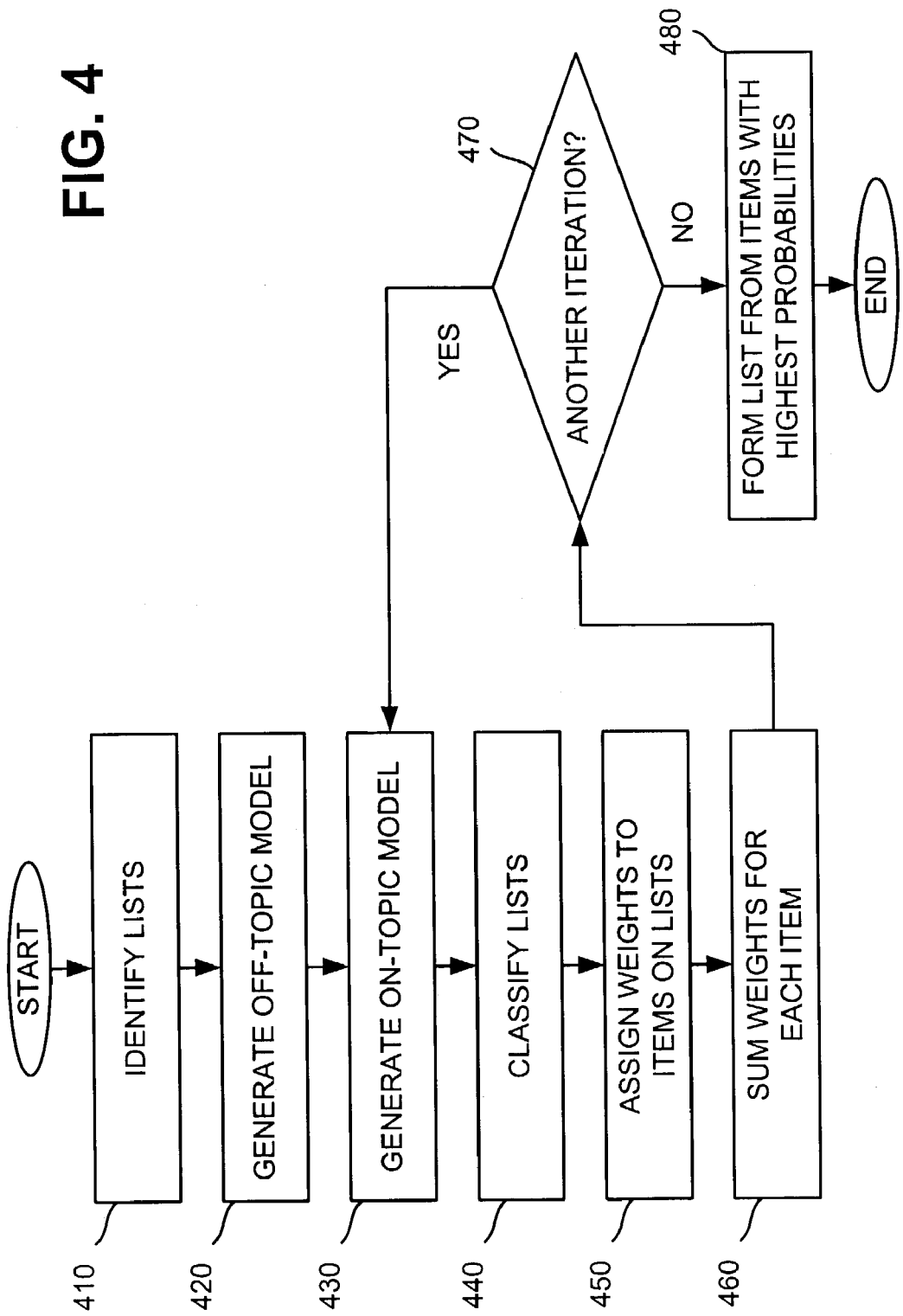
FIG. 4 is a flowchart of exemplary processing for creating lists according to an implementation consistent with the principles of the invention.

FIG. 4 is a flowchart of exemplary processing for creating lists according to an implementation consistent with the principles of the invention. Processing may commence with the identification of existing lists that are available on network 130 and/or 140 (act 410). List identifier 310 may analyze documents on network 130 and/or 140 to determine whether the documents contain lists. Lists may be identified in a number of ways. For example, a list may be identified by a HTML tag (e.g., <UL>, <OL>, <DL>, <H1>-<H6> tags). A list may also be identified from items placed in a table, items separated by commas or semicolons, or items separated by tabs. It may also be possible to identify a list in other ways.

List identifier 310 may create a hit list index based on the lists that it identifies. The hit list index may include a mapping of items (which may include one or more words) to the lists in which the items appear. The hit list index may permit the future identification of relevant lists to be performed in an efficient manner.

An off-topic model may be generated (act 420). List classifier 320 may create a probabilistic model (i.e., the off-topic model) that may output items uniformly at random according to the relation:

$$P(W_i|C0)=u, \text{ for all } W_i$$

where $W_i$ refers to an item, C0 refers to the off-topic model, and u refers to a small probability assigned to all items.

Figure 5:
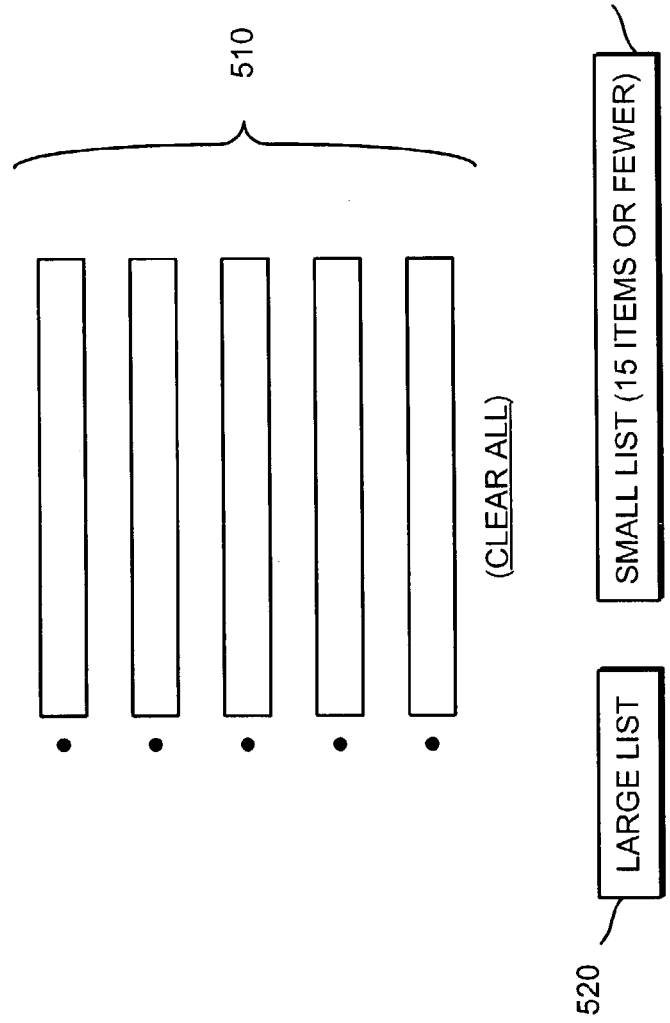
FIG. 5 is a diagram of an exemplary graphical user interface that may be presented to a user to facilitate the providing of example items.

An on-topic model may also be generated (act 430). In an implementation consistent with the principles of the invention, the on-topic model is generated based on one or more example items provided by client 110. For example, client 110 may provide one or more example items and request completion of a list that contains the example item(s). FIG. 5 is a diagram of an exemplary graphical user interface 500 that may be presented to a user of client 110 to facilitate the providing of example items. Graphical user interface 500 may prompt the user to enter one or more example items (boxes 510). Graphical user interface 500 may also include "Large List" button 520 and "Small List" button 530. Large List button 520 may be selected by the user if the user desires a list containing more than a predetermined number of items (e.g., more than 15 items). Small List button 530 may be selected by the user if the user desires a list containing less than a predetermined number of items (e.g., 15 or fewer items).

Returning to FIG. 4, list classifier 320 may create a probabilistic model (i.e., the on-topic model) based on the example item(s) provided by client 110. List classifier 320 may assign a probability to any item that may be output by the on-topic model, according to the relation:

$$P(W_i | C1) = \begin{cases} x & \text{if } W_i = \text{example item 1} \\ x & \text{if } W_i = \text{example item } n \\ \varepsilon & \text{otherwise} \end{cases}$$

where $W_i$ refers to an item, C1 refers to the on-topic model, x refers to a probability assigned to example items 1-n (where $n \geq 1$), and $\varepsilon$ refers to a small probability assigned to all other items.

List classifier 320 may assign a higher probability to the example item(s) provided by client 110. For example, if client 110 provided two example items, list classifier 320 may assign a first one of the example items a probability of 0.49, the second example item a probability of 0.49, and any other random item a very small probability, such as 0.02. In this case, the probability of the on-topic model outputting the first example item is 0.49, the second example item is 0.49, and a random item is 0.02.

The lists identified by list identifier 310 may be classified using the on-topic and off-topic models (act 440). For example, list classifier 320 may determine the probability of each of the lists being generated given the on-topic model using, for example, an expectation maximization technique. List classifier 320 may determine the probability that a particular list was generated from the on-topic model based on the probability that each of the items in the list is generated from the on-topic model. This may be represented by:

$$P(C1 | L) \propto P(L | C1)P(C1) \propto \prod_i P(W_i | C1)P(C1)$$

where L refers to a list and $W_i$ refers to an item in the list L. P(L|C1) refers to the probability of generating list L given that it is on-topic. P(C1) refers to the probability that a list is on topic before considering the items in the list. P(C1) may be user-configurable. In one exemplary implementation, P(C1) is set to approximately 0.1.

As a result, the more items on the list, the less confident list classifier 320 may be that the list was generated from the on-topic model. For example, for a list with three items, two of which include the example items, list classifier 320 may be pretty confident that the other item on the list is relevant to the two example items. On the other hand, for a list with one hundred items, two of which include the example items, list classifier 320 may not be confident at all that the other items on the list are relevant to the two example items.

List classifier 320 may also determine the probability of each of the lists being generated given the off-topic model. List classifier 320 may determine the probability that a particular list was generated from the off-topic model based on the probability that each of the items in the list is generated from the off-topic model. This may be represented by:

$$P(C0 | L) \propto P(L | C0)P(C0) \propto \prod_i P(W_i | C0)P(C0)$$

where L refers to a list and $W_i$ refers to an item in the list L. P(L|C0) refers to the probability of generating list L given that it is off-topic. P(C0) refers to the probability that a list is off topic before considering the items in the list. P(C0) may be user-configurable. In one exemplary implementation, P(C0) is set to approximately 0.9.

The equation above for P(C1|L) indicates that it is proportional to some quantity. In other words, the value of P(C1|L) may only be determined up to some "unknown" constant factor A. Therefore, the equation may be rewritten as A*P(C1|L). To be able to use this equation to classify a list L, the value of A must be determined. To do this, the equation above for P(C0|L), which may be rewritten as A*P(C0|L), may be used. Therefore, even though the factor A is unknown, P(C1|L) can be determined from the relation:

$$P(C1 | L) = A * P(C1 | L) / (A * P(C1 | L) + A * P(C0 | L))$$

$$= \prod_i P(W_i | C1)P(C1) \bigg/ \bigg( \prod_i P(W_i | C1)P(C1) + \prod_i P(W_i | C0)P(C0) \bigg)$$

Once the probabilities of the lists are determined, the items in the lists may be assigned weights based on the probabilities of their associated lists (act 450). In other words, each item in a list may be assigned a weight equal to the on-topic probability of that list. For example, each of the items in a list with a probability of 0.9 is assigned the weight 0.9. An item may appear in multiple lists and can be assigned multiple weights corresponding to the lists in which it appears. The weights of the items may then be added together to generate total weights for the items (act 460). For example, list classifier 320 may add up the weights for an item to obtain a total weight for that item.

It may then be determined whether another iteration of the above processing should be performed (act 470). For example, acts 430-470 may be repeated a predetermined number of times. List classifier 320 may update the on-topic model based on the items and their total weights (act 430). List classifier 320 may assign a probability to each of the items. For example, list classifier 320 may determine the probability of an item based on the total weight of the item divided by the sum of the total weights of all of the items.

The lists identified by list identifier 310 may then be reclassified using the on-topic model (act 440). For example, list classifier 320 may determine the probability of each of the lists being generated given the updated on-topic and off-topic models, as described above. List classifier 320 may determine the probability that a particular list was generated from the updated on-topic model based on the probability that each of the items in the list is generated from the updated on-topic model.

The items in the lists may then be assigned weights based on the probabilities of their associated lists (act 450). In other words, each item in a list may be assigned a weight equal to the on-topic probability of the list. The weights of the items may then be added together to generate total weights for the items (act 460). For example, list classifier 320 may add up the weights for an item to obtain a total weight for that item.

It may then be determined whether another iteration of the above processing should be performed (act 470). When a sufficient number of iterations have been performed, a list may be formed from the items with the highest probabilities (act 480). For example, list processor 330 may identify items with total weights above a threshold, items with probabilities above a threshold, the top z (where z is a predetermined number) items based on total weight or probability, items based on the distribution of weights or probabilities, or some other identified group of items as the items to be included in the list. List processor 330 may remove items that contain too many words from the list. For example, list processor 330 may set a threshold and remove items that contain more than the threshold number of words. The threshold may be set, for example, based on the average number of words in each list item.

If the user requested a small list, then list processor 330 may use the top 15 or fewer items based on total weights or probabilities for the list. If the user requested a large list, then list processor 330 may use the top 16 or more items (if possible) based on total weights or probabilities for the list.

List processor 330 may then present the list to client 110. Client 110 may, in turn, provide the list to the user. The list may be provided to the user as a selectable list of items. Selection of one of the items in the list may, for example, cause a search to be performed for documents relating to that item and/or presentation of documents relating to that item.

EXAMPLE

FIGS. 6A-6J illustrate an example of generating a list according to an implementation consistent with the principles of the invention. The actual values used in the example below are provided merely to assist in the understanding of the processing described above. These values may or may not be consistent with the equations provided above. Also, certain acts may be omitted from the discussion to follow in order to not over-complicate the example.

Figure 6A:
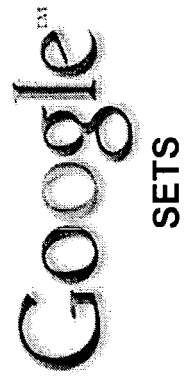

For this example, assume that a user desires a short list of automobile manufacturers. As shown in FIG. 6A, the user provides the example items: Honda and BMW. The user may then select the small list button.

Assume that list identifier 310 identified four existing lists, as shown in FIG. 6B. The first list includes the items Honda, BMW, Toyota, and Jaguar. The second list includes the items Honda, Jaguar, Nissan, and Ford. The third list includes the items Honda, Matt, Kim, and Mikey. The fourth list includes the items Toyota, Mazda, Jaguar, Nissan, Ford, Dodge, Buick, and Infinity.

List classifier 320 may create a probabilistic model (i.e., the on-topic model) based on the example item(s) provided by the user. List classifier 320 may assign a probability to items that may be output by the on-topic model, according to the relation:

$$P(W_i \mid CI) = \begin{cases} 0.49 & \text{if } W_i = \text{Honda} \\ 0.49 & \text{if } W_i = \text{BMW} \\ 0.02 & \text{otherwise} \end{cases}$$

Therefore, the probability of the on-topic model outputting Honda is 0.49, BMW is 0.49, and any other random item is 0.02.

List classifier 320 may determine the probability of each of the lists being generated given the on-topic model. List classifier 320 may determine the probability that a particular list was generated from the on-topic model based on the probability that each of the items in the list is generated from the on-topic model. Assume that list classifier 320 determines the probability of the first list as 0.9, the probability of the second list as 0.2, the probability of the third list as 0.2, and the probability of the fourth list as 0.001, as shown in FIG. 6C.

Figure 6D:
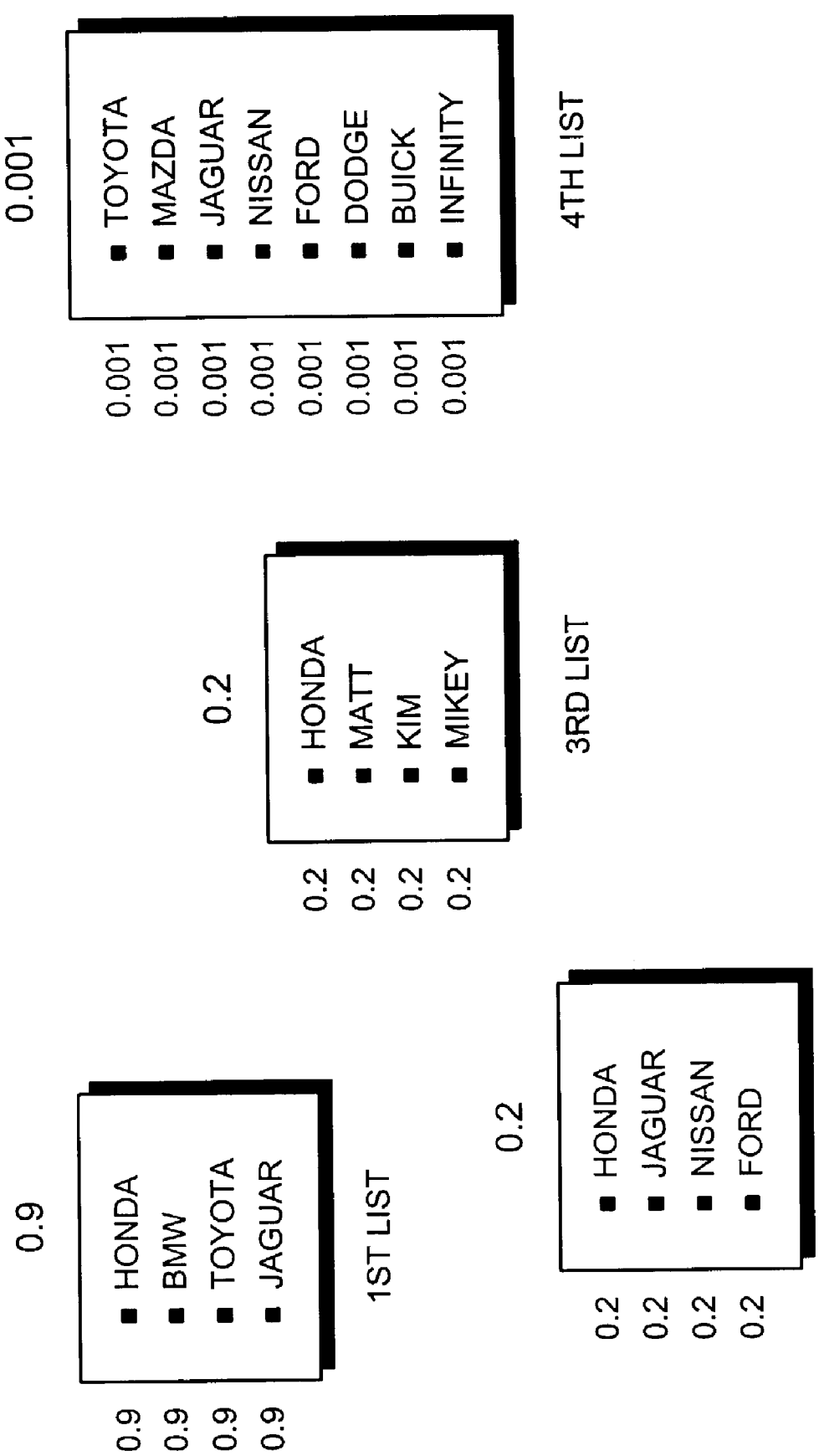

List classifier 320 may assign weights to the items in the lists based on the probabilities of their associated lists. In other words, each item in a list may be assigned a weight equal to the probability of the list. In this case, list classifier 320 may assign the weight 0.9 to each of the items in the first list, the weight 0.2 to each of the items in the second list, the weight 0.2 to each of the items in the third list, and the weight 0.001 to each of the items in the fourth list, as shown in FIG. 6D.

List classifier 320 may then add the weights of the items together to generate total weights for the items. In this case, list classifier 320 may determine total weights for the items in the lists, as shown in FIG. 6E.

List classifier 320 may then determine whether another iteration of the above processing should be performed. Assume that list classifier 320 is programmed to perform three iterations. In this case, list classifier 320 may update the on-topic model using the items and their total weights. List classifier 320 may then assign a probability to each of the items. List classifier 320 may determine the probability of an item based on the total weight of the item divided by the sum of the total weights of all of the items. For the item Honda, for example, list classifier 320 may determine the probability as 0.250 (i.e., total weight for Honda/total weights of all items=1.3/5.208=0.250).

Figure 6F:
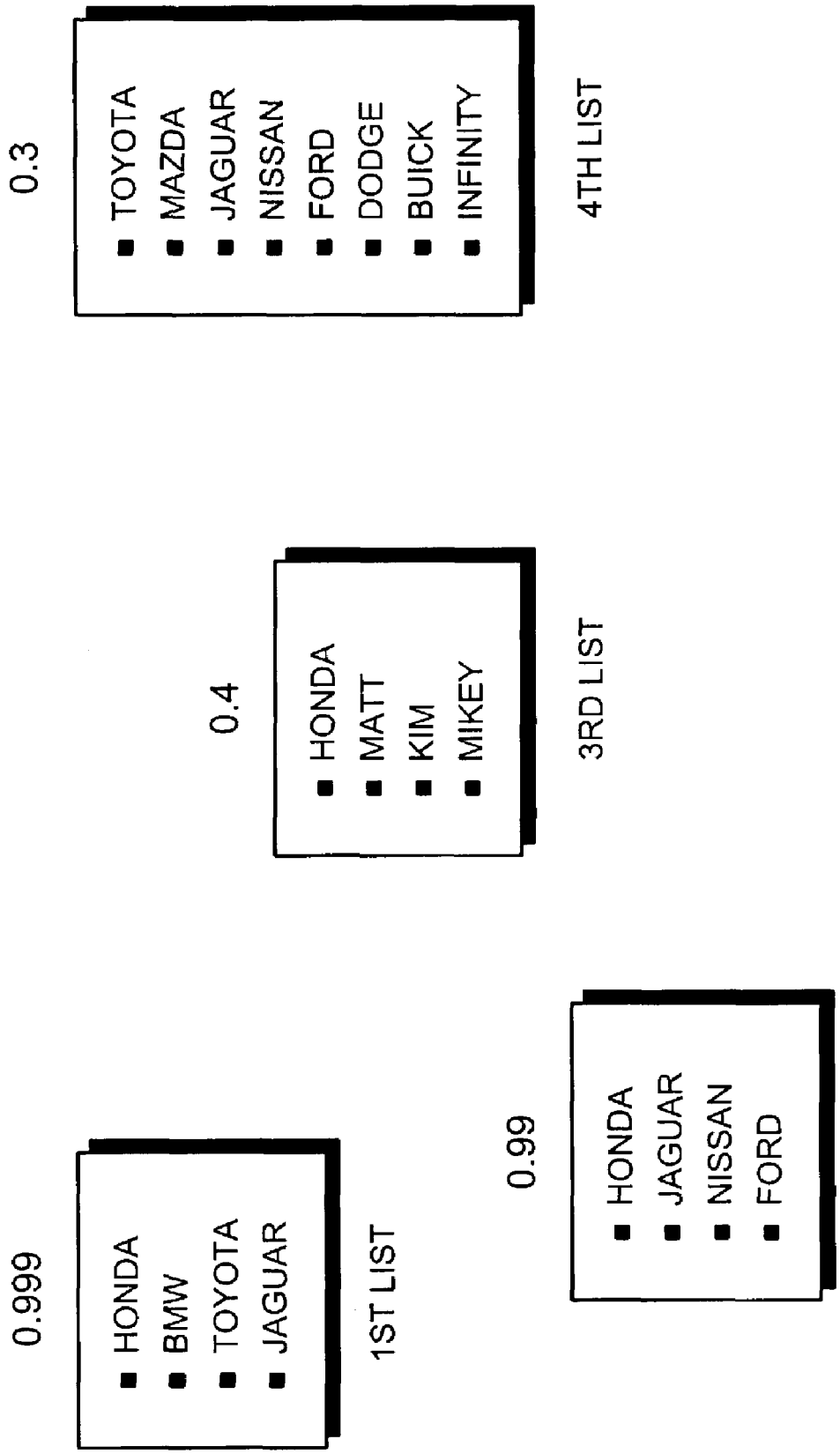

List classifier 320 may then reclassify the lists. For example, list classifier 320 may determine the probability of each of the lists being generated given the updated on-topic model. As explained above, list classifier 320 may determine the probability that a particular list was generated from the updated on-topic model based on the probability that each of the items in the list is generated from the updated on-topic model. Assume that list classifier 320 determines the probability of the first list as 0.999, the probability of the second list as 0.99, the probability of the third list as 0.4, and the probability of the fourth list as 0.3, as shown in FIG. 6F.

List classifier 320 may assign weights to the items in the lists based on the probabilities of their associated lists. In other words, each item in a list may be assigned a weight equal to the probability of the list. In this case, list classifier 320 may assign the weight 0.999 to each of the items in the first list, the weight 0.99 to each of the items in the second list, the weight 0.4 to each of the items in the third list, and the weight 0.3 to each of the items in the fourth list.

List classifier 320 may then add the weights of the items together to generate total weights for the items. In this case, list classifier 320 may determine total weights for the items in the lists, as shown in FIG. 6G.

List classifier 320 may then update the on-topic model again using the items and their total weights. List classifier 320 may assign a probability to each of the items. List classifier 320 may determine the probability of an item based on the total weight of the item divided by the sum of the total weights of all of the items. For the item Honda, for example, list classifier 320 may determine the associated probability as 0.210.

List classifier 320 may then reclassify the lists. For example, list classifier 320 may determine the probability of each of the lists being generated from the updated on-topic model based on the probability that each of the items in the list is generated from the updated on-topic model. Assume that list classifier 320 determines the probability of the first list as 0.999, the probability of the second list as 0.999, the probability of the third list as 0.3, and the probability of the fourth list as 0.9, as shown in FIG. 6H.

List classifier 320 may assign weights to the items in the lists based on the probabilities of their associated lists. In this case, list classifier 320 may assign the weight 0.999 to each of the items in the first list, the weight 0.999 to each of the items in the second list, the weight 0.3 to each of the items in the third list, and the weight 0.9 to each of the items in the fourth list.

List classifier 320 may then add the weights of the items together to generate total weights for the items. In this case, list classifier 320 may determine total weights for the items in the lists, as shown in FIG. 6I.

Figure 6J:
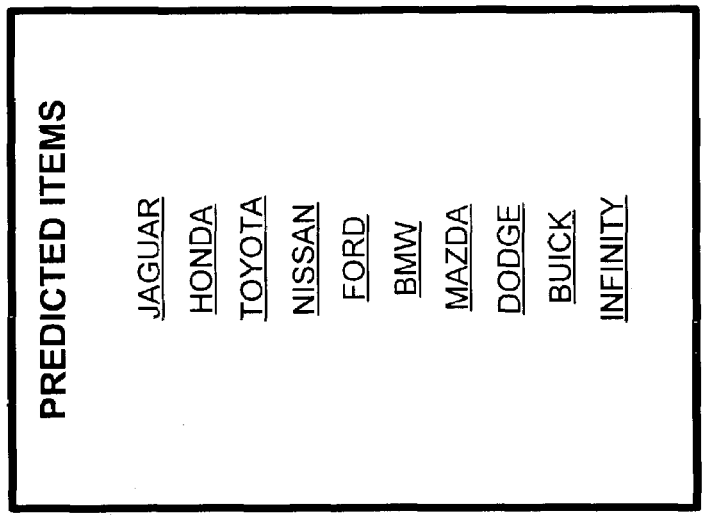

List processor 330 may now form a list from the items with the highest total weights or probabilities or select items for the list based on the distribution of weights or probabilities. For example, list processor 330 may select items with a total weight above 0.75. List processor 330 may then present the list of items in order based on the weights/probabilities, as shown in FIG. 6J. Alternatively, list processor 330 may present the list in a random order or by listing the example items first. List processor 330 may transmit the list to client 110 for presentation to the user. The list may be presented to the user as a selectable list of items. Selection of one of the items in the list may cause a search to be performed for documents relating to that item.

Other Exemplary Implementations

Off-Topic Model

Thus far, the off-topic model has been described as generating items at random according to the relation:

$$P(W_i|CO) = u, \text{ for all } W_i$$

Unlike the on-topic model, the off-topic model is not updated in this implementation. Accordingly, the off-topic model may always output items uniformly at random.

In another implementation, the off-topic model is generated based on one or more example items that are off topic. Like the on-topic example items, these example items may be provided by a user (or client 110). The off-topic model, in this case, may be biased toward the example items given by the user, meaning that the example items may be given a higher probability of being generated by the off-topic model than any other items. The off-topic model may maintain this initial probability assignment for processing of the lists. Alternatively, it may be possible for processing relating to the off-topic model to update and reiterate similar to the processing related to the on-topic model.

Hit List Index

A hit list index has been previously described as containing a mapping of items to the lists in which the items appear. It is inefficient to scan and classify all lists on network 130 and/or network 140 in real time. The hit list index makes it possible to locate relevant lists quickly. Relevant lists are lists that contain one or more of the example items that are on topic. All other lists can be assigned a predetermined (low) probability and not be considered further (though they may be considered in later iterations after updating of the on-topic model).

When updating the on-topic model, it may also be possible to consider only highly relevant items (i.e., items with total weights above a threshold). Low weighted items may be discarded. This may serve to expedite the list generation process by eliminating consideration of items with low weights and lists with none of the highly relevant items.

Master-Slave Configuration

Figure 7:
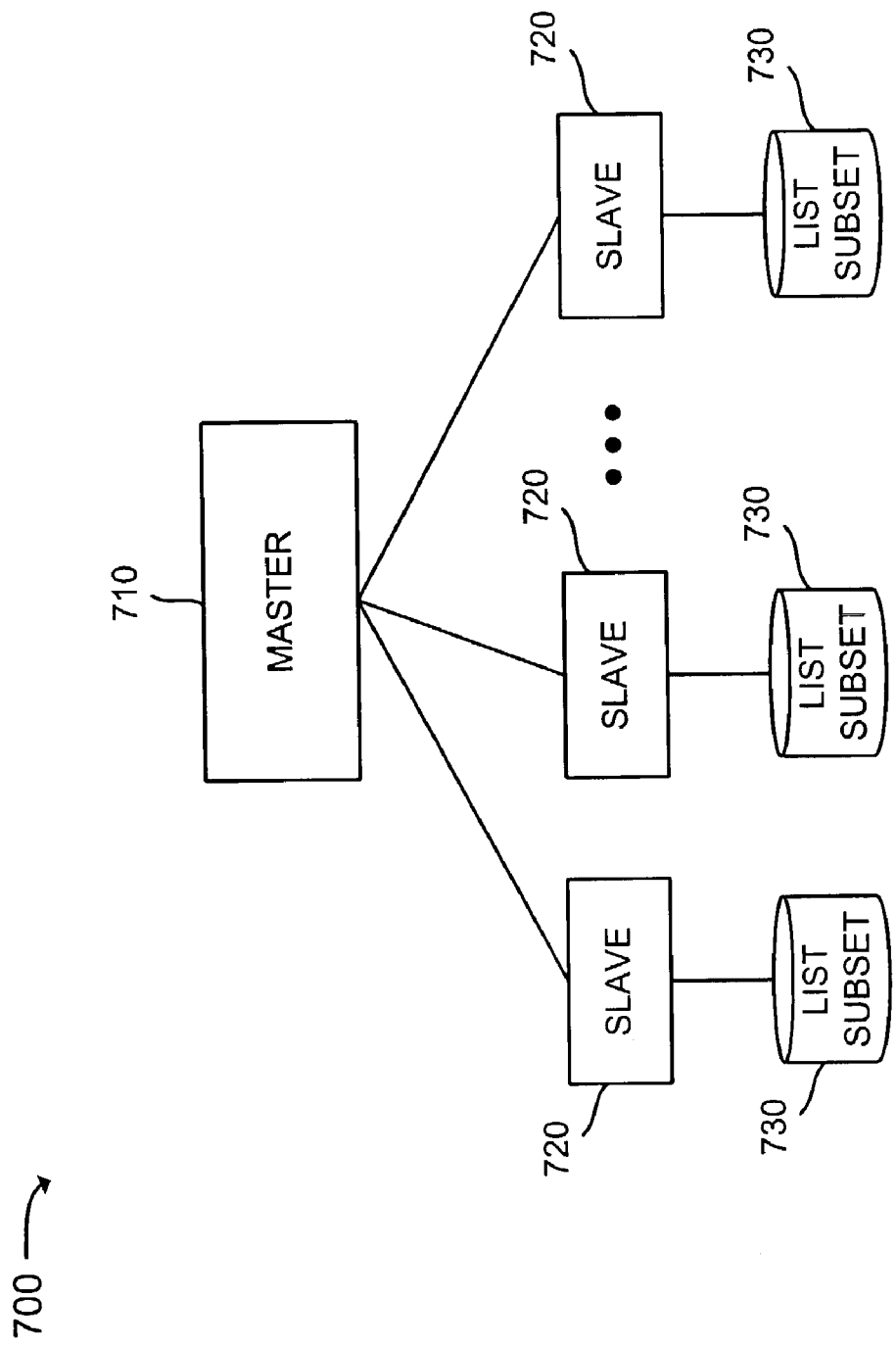
FIG. 7 is an exemplary diagram of a master-slave system consistent with the principles of the invention.

Instead of performing list generation processing on a single device, such as server 120, the processing may be spread over several devices. FIG. 7 is an exemplary diagram of a master-slave system 700 consistent with the principles of the invention. System 700 may include master 710 and multiple slaves 720. Each of slaves 720 may be responsible for a subset of the total existing set of lists (referred to as list subset 730). Master 710 may generate the on-topic and off-topic models. Master 710 may then distribute the models to slaves 720.

Slaves 720 may classify the lists in their respective list subset 730 based on the models. Slaves 720 may also assign weights to the items in the lists and generate the total weights for the items, as described above. Slaves 720 may return the items with their total weights to master 710. Master 710 may then update the on-topic model (and, if necessary, the off-topic model) and send the updated model(s) to slaves 720. This process may repeat for a predetermined number of iterations, as described above.

CONCLUSION

Systems and methods consistent with the principles of the invention automatically generate lists given one or more examples. The systems and methods may use probabilistic modeling to predict lists in a noise tolerant, efficient, and quick manner. Using a probabilistic approach allows the list generation process to be more noise tolerant because there is no deterministic inclusion or exclusion of examples from the predicted list. Instead, all items are assigned weights.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 4, the order of the acts may be differ in other implementations consistent with the present invention. Moreover, non-dependent acts may be performed in parallel.

Also, it has been described that list identifier 310 locates existing lists that are available on network 130 and/or network 140. It has also been described that list classifier 320 classifies the lists identified by list identifier 310. In another implementation, list classifier 320 classifies existing lists that are stored in one or more databases (locally or remotely connected to server 120) instead of, or in addition to, the lists available on network 130 and/or network 140.

Moreover, it has been described that the probabilities of lists (and items in the lists) are determined as part of the list classifying process. In other implementations, other measures of confidence or uncertainty, such as ad-hoc weights or scores of confidence or uncertainty, may be used to classify lists (and items in the lists).

Further, certain portions of the invention have been described as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method, comprising:
   determining an on-topic model;
   identifying a plurality of lists within one or more documents;
   determining probabilities of the plurality of lists being generated using the on-topic model;
   forming a list from items in the plurality of lists based on the determined probabilities; and
   presenting the list to a client.

2. The method of claim 1, further comprising:
   receiving one or more example items; and
   wherein the determining an on-topic model includes:
   determining a probabilistic model based on the one or more example items.

3. The method of claim 2, wherein the determining a probabilistic model includes:
   assigning higher probabilities to the one or more example items than to other items.

4. The method of claim 1, wherein identifying the plurality of lists includes:
   locating the plurality of lists within a plurality of documents on one or more networks.

5. The method of claim 1, wherein the plurality of lists are identified by tags, by items stored in a table, or by items separated by tabs, commas, or semicolons.

6. The method of claim 1, further comprising:
   creating a hit list index from the plurality of lists, the hit list index providing a mapping of items to one or more of the plurality of lists in which the items appear.

7. The method of claim 1, wherein the plurality of lists are stored in one or more databases.

8. The method of claim 1, wherein determining the probabilities includes:
   determining a probability of one of the plurality of lists being generated using the on-topic model based on a probability of each of the items in the one of the plurality of lists being generated from the on-topic model.

9. The method of claim 1, further comprising:
   assigning weights to the items in one of the plurality of lists based on the determined probability associated with the one of the plurality of lists; and
   adding the weights for each of the items to generate total weights for the items.

10. The method of claim 9, wherein the forming a list includes:
    forming the list based on the items from the plurality of lists and the total weights for the items.

11. The method of claim 9, further comprising:
    updating the on-topic model based on the items and the total weights for the items; and
    determining new probabilities for the plurality of lists based on the updated on-topic model.

12. The method of claim 11, wherein the forming a list includes:
    forming the list based on the plurality of lists and the new probabilities.

13. The method of claim 11, further comprising:
    repeating the updating of the on-topic model and the determining of the new probabilities for the plurality of lists for a predetermined number of iterations.

14. The method of claim 1, wherein the probabilities of the plurality of lists being generated using the on-topic model are related to a number of items in the plurality of lists.

15. The method of claim 1, wherein the list includes a plurality of selectable items, selection of one of the selectable items causing a search of documents relating to the one selectable item to be performed.

16. The method of claim 1, further comprising:
    determining an off-topic model.

17. The method of claim 16, wherein determining the probabilities includes:
    determining probabilities for the plurality of lists based on the on-topic model or the off-topic model.

18. The method of claim 16, further comprising:
    receiving one or more off-topic example items; and
    wherein the determining an off-topic model includes:
    determining a probabilistic model based on the one or more off-topic example items.

19. A system, comprising:
    means for identifying a plurality of lists associated with one or more documents;
    means for determining an on-topic model and an off-topic model;
    means for classifying the plurality of lists based on the on-topic model and the off-topic model to determine probabilities of the plurality of lists being generated using the on-topic model or the off-topic model;
    means for forming a list from items in the plurality of lists based on the determined probabilities; and
    means for providing the list to a client.

20. A system, comprising:
    a list identifier configured to identify a plurality of lists by crawling one or more networks, each of the plurality of lists including a plurality of items;

a list classifier configured to:
  determine an on-topic model, and
  determine confidence scores reflecting measures of confidence of the plurality of lists being generated using the on-topic model; and
a list processor configured to:
  form a list from the items in the plurality of lists based on the determined confidence scores associated with the plurality of lists, and
  present the list to a client.

21. A system, comprising:
means for receiving one or more example items;
means for identifying a plurality of lists by crawling one or more networks;
means for determining confidence scores for the plurality of lists based on the one or more example items, each of the plurality of lists including a plurality of items;
means for forming a list from the items in the plurality of lists based on the confidence scores for the plurality of lists; and
means for providing the list to a client.

22. A system, comprising:
a list identifier configured to identify a plurality of lists, each of the plurality of lists including a plurality of items;
a list classifier configured to assign confidence weights to the plurality of lists; and
a list processor configured to:
  form a list from the items in the plurality of lists based on the confidence weights assigned to the plurality of lists, and
  present the list to a client.

23. A system, comprising:
a list identifier configured to identify a plurality of lists, each of the plurality of lists including a plurality of items;
a list classifier configured to:
  receive one or more example items,
  determine probabilities that the plurality of lists are associated with the one or more example items,
  assign weights to the items in the plurality of lists based on the probabilities of the plurality of lists, and
  add the weights for each of the items to generate total weights for the items; and
a list processor configured to:
  form a list based on the items and the total weights for the items, and
  present the list to a client.

24. A method, comprising:
receiving one or more example items;
determining an on-topic model based on the one or more example items;
classifying a plurality of lists based on the on-topic model;
assigning weights to items in the plurality of lists based on the classifying of the plurality of lists;
adding the weights for each of the items to generate a total weight for each of the items;
forming a list based on the items and the total weights for the items; and
presenting the list to a client.

25. The method of claim 24, further comprising:
updating the on-topic model based on the items and the total weights for the items;
reclassifying the plurality of lists based on the updated on-topic model;
reassigning weights to the items based on the reclassifying of the plurality of lists; and
adding the reassigned weights for each of the items to generate a new total weight for each of the items.

26. The method of claim 25, wherein the forming the list includes:
forming the list based on the items and the new total weights for the items.

27. A system, comprising:
a master configured to:
  receive, from a client, one or more example items, and
  determine an on-topic model based on the one or more example items; and
a plurality of slaves, each of the slaves being configured to:
  classify a subset of a plurality of lists based on the on-topic model,
  assign weights to items in the plurality of lists based on the classified lists,
  add the weights for each of the items to generate a total weight for each of the items,
  send the items and the total weights for the items to the master,
the master using the items and the total weights for the items to form a list, and present the list to the client.

* * * * *